United States Patent

[11] 3,610,593

| [72] | Inventors | Josef Varga;<br>Jiri Kosar; Milan Brand, all of Hradec Kralove, Czechoslovakia |
|---|---|---|
| [21] | Appl. No. | 861,927 |
| [22] | Filed | Sept. 29, 1969 |
| [45] | Patented | Oct. 5, 1971 |
| [73] | Assignee | Tesla narodni podnik<br>Praha, Czechoslovakia |
| [32] | Priority | Oct. 2, 1968 |
| [33] | | Czechoslovakia |
| [31] | | Pv 6840-68 |

[54] FEEDING DEVICES FOR CERAMIC OVENS
7 Claims, 4 Drawing Figs.

[52] U.S. Cl. ................................................. 263/6 R
[51] Int. Cl. .................................................. F27b 9/14, F27d 3/04
[50] Field of Search ...................................... 263/6

[56] References Cited
UNITED STATES PATENTS

| 1,227,027 | 5/1917 | Baily et al. ................... | 263/6 |
| 1,920,133 | 7/1933 | Summey ....................... | 263/6 |
| 3,051,812 | 8/1962 | Gschwender ................ | 263/6 X |
| 3,322,413 | 5/1967 | Orth ............................. | 263/6 |

FOREIGN PATENTS

| 1,149,377 | 5/1963 | Germany ...................... | 263/6 |

Primary Examiner—Charles J. Myhre
Attorneys—Richard Low and Murray Schaffer

ABSTRACT: An oven for curing ceramic objects having a kiln, a support mounted therein, a movable rod mounted for axial movement in alignment with the support, means for delivering successive workpieces between the rod and the support and means for continuously reciprocating the rod in the axial direction to move the workpieces through the oven.

FEEDING DEVICES FOR CERAMIC OVENS

BACKGROUND OF THE INVENTION

The present invention relates to ovens for curing ceramic objects and in particular to apparatus for automatically feeding and moving workpieces therethrough.

Curing ovens are generally provided with workpiece supports which rotate or revolve the workpiece while it is maintained within the firing zone of the oven. Conventionally, however, the ceramic workpiece is fed and removed from the oven manually by the operator or attendant. This manual operation often results in irregular firing or curing of the workpiece, inefficient utilization of the curing oven and of the time of the operator.

It is an object of present invention to provide apparatus for feeding and moving ceramic objects through a curing oven.

It is another object of the present invention to provide apparatus for automatically feeding and indexing in stepped movement an elongated object through a curing oven.

It is a further object of the present invention to provide an improved ceramic-curing oven of increased capacity and efficiency.

It is still another object of the present invention to provide for the improved handling of ceramic objects and then curing.

SUMMARY OF THE INVENTION

According to the present invention there is provided apparatus in combination with a kiln having a support for maintaining a workpiece therein comprising a movable rod mounted in axial alignment with the support, means for feeding successive workpieces between the support and the rod, means for continuously reciprocating the rod in the axial direction so as to move successive workpieces through the kiln in conjunction with the support.

In the preferred form of the apparatus the means for reciprocating the rod including means for cyclically indexing the rod in the forward direction and means for withdrawing the rod in a smooth singular motion.

It is also preferred to provide hopper means for automatically delivering the workpiece between the rod and support.

It is also preferred that the pushrods be mounted on a movable carriage secured against rotary movement and provided with pulley and motor means for activation.

A full description of the present invention follows herein, where the aforementioned objects and additional advantages are made apparent. In the description references is made to the accompanying drawings.

DESCRIPTION OF THE INVENTION

Figure 1:
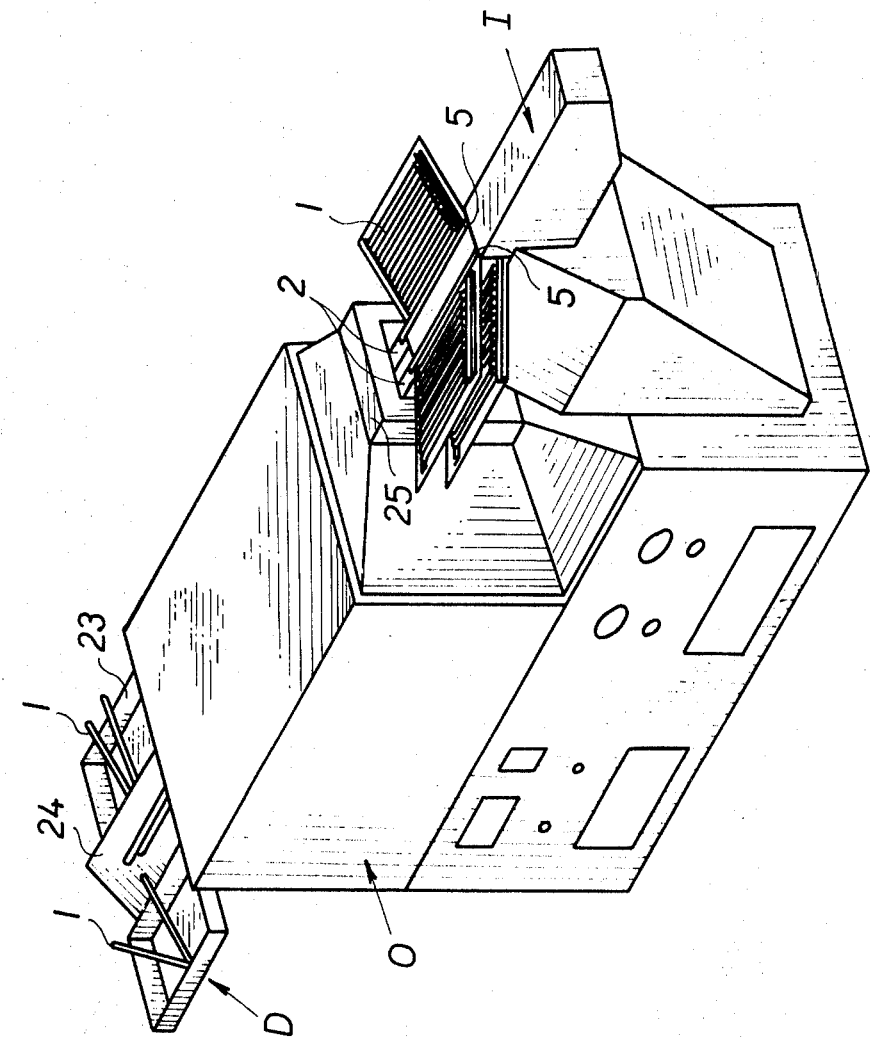
FIG. 1 is a perspective view of a curing oven employing the present invention.
Figure 2:
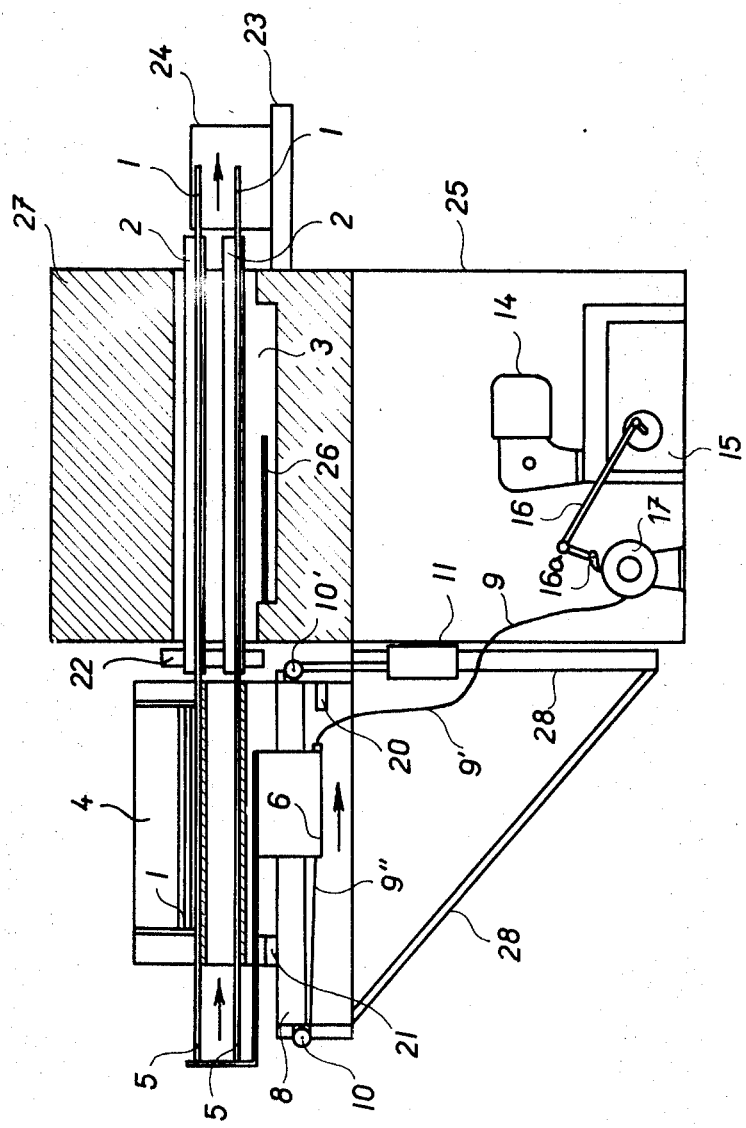
FIG. 2 is a schematic view, partially sectioned, of the oven shown in FIG. 1.

Turning to FIGS. 1 and 2 the device of the present invention comprises an oven O, having an infeed section I, by which uncured workpieces 1 are fed to a rotating support 2 for travel through a kiln 3 to a discharge device D.

The infeed section I comprises a hopper or inclined storage device 4 adapted to be automatically or manually filled with unfired objects 1. The hopper 4 is provided with multiple guide chutes for feeding the objects 1 in axial alignment with the receiving elements (not shown) of the support 2. Mounted below the hopper 4 is a pushrod 5 associated with each hopper guide chute. The pushrods 5 extend in cantilevered fashion from a bracket which is mounted on carriage 6 supported on a hollow tubular rail 8. The rail 8 is provided with an axially extending slot 7 to which the carriage is keyed by conventional means so as to be reciprocally movable thereon but not rotative relative thereto.

Figure 3:
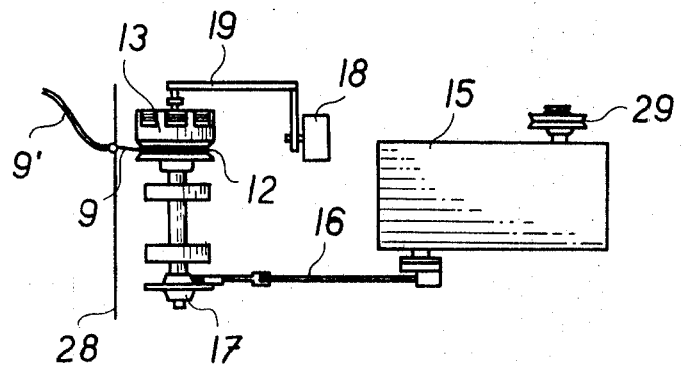
FIG. 3 is a perspective view of the detail of the apparatus for moving the workpieces.
Figure 4:
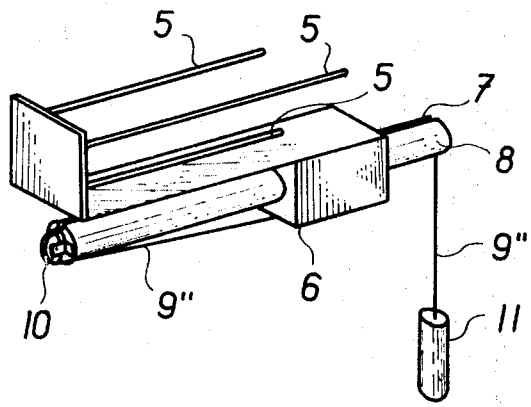
FIG. 4 is a schematic plan view showing further detail of the drive mechanism for the apparatus of FIG. 3.

A wire or rope or other suitable flexible member 9 is connected by one end to the front of the carriage 6 and by its other end to a pulley winch 12 (FIG. 3). The wire 9 is sheathed in a bowden tubular guide so that it remains rigid and capable of reciprocal movement on rotation of the winch 12. As seen in FIGS. 2 and 3 the winch 12 is driven by an electric motor 14 via a variable resistance control device or barretter 15, a lever linkage 16 at the end of which is a pawl 16a engaging with a circular ratchet 17. It will then be observed that intermittent or step-by-step indexing and unidirectional movement in the direction of arrow A is provided, to effect simultaneous movement of the pushrods 5 and consequently the workpiece objects 1 into the kiln 3.

The winch 12 is provided with a multiple-plate clutch mechanism 13 connected via a lever 19 to a solenoid 18 which is controlled in response to the position of the carriage 6 as will be described later. The clutch 13 is thereby provided to selectively cause the winch 12 to be inoperative, not withstanding the continual operation of the motor 14.

A second wire or rope member 9" is connected at one end to the rear of the carriage 6 and is wound over a pulley 10, a second pulley 10' and fastened to a deadweight 11 hanging freely within the frame of the machine.

The input section is completed by providing a pair of limit switches 20 and 21, preferably of the microswitch type at the forward and rear extremities respectively of the carriage travel. Both switches 20 and 21 are connected to and control the solenoid 18 which activates the clutch 13. The switches are in normally off position and are activated only when engaged by the carriage 6, so that when the carriage 6 engages the forward switch 20 the clutch 13 is deactivated and when the carriage 6 engages the rear switch 21 the clutch 13 is activated. It will thus be seen that when the clutch 13 is deactivated the winch 12 releases its pull on the wire 9, and the weight 11 causes the carriage to be moved to the rear, contra to the arrow A, until the carriage 6 engages the switch 21. At this point the clutch 13 is activated and the winch 12 rolls the wire 9 about it in incremental fashion (due to the ratchet 17 and pawl 16a) until the carriage engages the forward switch 20. During this forward movement the push rods 5 engage the ends of the workpiece 1 and move them through the kiln 3.

When the carriage 6 engages the switch 20, the clutch 13 is again deactivated and the procedure repeats itself.

The discharge end of the apparatus is provided with trays 23 for receiving the now-cured objects 1 which are first fed onto an inclined plate 24 from which they slide into the trays.

The entire oven apparatus including the infeed section I is covered by a shield 25. The hopper 4 and the trays 23 are of course freely accessible.

Returning to FIG. 2 the kiln contains such conventional parts as a heating element 26, a heat lining 27 and a frame 28. The workpiece support 2 is provided with a collar 22 rotated by conventional means (not shown) so that the workpieces 1 are revolved during passage within the kiln 3. A pulley 29 is shown in FIG. 3 which is employed to connect the motor 14 to the control device 15. A belt is however not shown.

In operation the uncured ceramic objects are loaded into the hopper 4, wherefrom they fall into alignment with the support 2. The objects fall when the pushrods 5 are in their rearmost position so that the rods 5, objects 1 and support 2 are in axial alignment. Since the carriage 6 must be, at this stage in its rearmost position and in engagement with the switch 21 the clutch 13 is activated. As a result the carriage is indexed forwardly by operation of the motor and the ratchet 7 pawl 6a drive. The rate at which forward movement is effected may be controlled by adjusting the variable potentiometer or barretter 15. The carriage 6 and consequently the objects 1 are indexed completely through the kiln 3, while being simultaneously rotated by the support 2, until they reach the discharge end.

At this stage the objects 1 fall freely into the trays 23 and the carriage 6 engages the forward switch 20. The switch 20 deactivates the clutch, the weight 11 falls and the carriage 6 is returned to its rearmost position, when the procedure repeats itself.

It will thus be seen that the aforementioned objects have been attained. The present invention has many advantages. For example the invention provides apparatus for uniformly indexing a workpiece through the kiln and for controlling the rate of speed at which it travels. Furthermore the device provides for automatic feeding and discharge in conformity with the requirement of the kiln. High productivity may be achieved because of the automatic nature of the apparatus and because of the more even and efficient firing and curing of workpieces.

Another major advantage lies in the fact that manual attendance is reduced to a minimum, namely only for the loading of the hopper. Because of this, increased speed and a better quality product is obtained.

Various modifications will lend themselves to those skilled in the art. For example the hopper may be provided with an automatic loading mechanism or may even be replaced by other means for axially feeding the workpiece to the pushrods; the weight 11 may be replaced by a pneumatic or hydraulic return mechanism; the carriage may be provided with a direct gear drive mechanism. Other changes can also be made. The present disclosure is therefore to be viewed only as illustrative of the present invention.

What is claimed:

1. Apparatus for moving ceramic workpieces through an oven having a kiln, comprising a support mounted within said kiln for maintaining the workpiece, a movable rod mounted for axial movement in alignment with the support, and means for delivering successive workpieces between the rod and the support, wherein said rod is mounted on a carriage, said carriage being slidably mounted on a rail for movement in the axial direction, first pulley means fastened to the rear end of said carriage, means for biasing said first pulley to normally cause said carriage to be maintained in a rearward position on said rail, second pulley means fastened to the forward end of said carriage, motor means connected to said second pulley means for moving said carriage forwardly against said bias, and means for intermittently controlling the operation of said motor means so as to move successive workpieces through the kiln in conjunction with the support.

2. The oven according to claim 5 wherein said means for controlling the operation of said motor includes clutch means for activating said second pulley means, and limit switch means adapted to engage said clutch means when the carriage is in its rearmost position and disengages said clutch means when the carriage is in its foremost position.

3. The oven according to claim 5 wherein the motor and second pulley means are connected by an intermittent motion device comprising a ratchet connected to said pulley and a lever and pawl connected to said motor whereby movement of said motor causes said pulley to index.

4. The oven according to claim 7 including adjustable control means for varying the speed of said motor.

5. The oven according to claim 5 wherein said support is rotatably mounted so as to rotate said workpieces within said kiln.

6. A feeding and shifting device used in combination with the kiln for firing axially symmetric ceramic objects, comprising a carriage adapted to be reciprocated in an axial direction within said kiln, said carriage being provided with at least one pushrod for delivering ceramic objects into said kiln, hopper means for placing ceramic objects to be treated in front of said rod, and driving means for cyclically operating said carriage so as to index said pushrod and ceramic object in predetermined steps in a forward direction through said kiln and in a continuous uninterrupted movement in the rearward direction after passage through said kiln.

7. The device according to claim 6 including means for varying the incremental step of said pusher.